(12) United States Patent
Lee et al.

(10) Patent No.: US 11,447,087 B2
(45) Date of Patent: Sep. 20, 2022

(54) CANOPY ASSEMBLY OF CONSTRUCTION MACHINERY

(71) Applicant: DOOSAN INFRACORE CO., LTD., Incheon (KR)

(72) Inventors: Sangkyoo Lee, Incheon (KR); Minkyu Yang, Incheon (KR)

(73) Assignee: DOOSAN INFRACORE CO., LTD., Incheon (KR)

( * ) Notice: Subject to any disclaimer, the term of this patent is extended or adjusted under 35 U.S.C. 154(b) by 0 days.

(21) Appl. No.: 16/979,317

(22) PCT Filed: Mar. 4, 2019

(86) PCT No.: PCT/KR2019/002468
§ 371 (c)(1),
(2) Date: Sep. 9, 2020

(87) PCT Pub. No.: WO2019/172586
PCT Pub. Date: Sep. 12, 2019

(65) Prior Publication Data
US 2021/0061210 A1   Mar. 4, 2021

(30) Foreign Application Priority Data
Mar. 9, 2018   (KR) .................... 10-2018-0028281

(51) Int. Cl.
*B60R 21/13*   (2006.01)
*E02F 9/16*   (2006.01)

(52) U.S. Cl.
CPC .......... *B60R 21/131* (2013.01); *E02F 9/163* (2013.01)

(58) Field of Classification Search
CPC ......... B60R 21/131; B60R 21/13; E02F 9/163
See application file for complete search history.

(56) References Cited

U.S. PATENT DOCUMENTS 3,612,581 A * 10/1971 Frankenberg ......... B60R 21/131
                                          403/224
4,102,537 A *  7/1978 Takahashi ............... B60N 2/38
                                          296/102

(Continued)

FOREIGN PATENT DOCUMENTS

EP       2980004 A1 *  2/2016  ............. B60J 7/165
JP       8-333774 A     12/1996

(Continued)

OTHER PUBLICATIONS

Machine Translation of WO2004026628 (Year: 2004).*

(Continued)

*Primary Examiner* — Paul N Dickson
*Assistant Examiner* — Kurtis Nielson
(74) *Attorney, Agent, or Firm* — Hauptman Ham, LLP (57) ABSTRACT

A canopy assembly includes a lower canopy installed fixedly in a side of a driver's seat and including a pair of first and second lower pipes that extend upwardly respectively, a pair of fastening blocks inserted and fixed into the first and second lower pipes respectively, each of the fastening blocks having a receiving hole therein that extends from an upper surface into the inside thereof, and an upper canopy including a pair of first and second upper pipes that are inserted and fixed into the receiving holes of the fastening blocks respectively.

10 Claims, 8 Drawing Sheets

(56) References Cited

U.S. PATENT DOCUMENTS

| | | | | |
|---|---|---|---|---|
| 4,877,265 | A * | 10/1989 | DeBraal | B60R 21/131 |
| | | | | 280/756 |
| 5,000,480 | A * | 3/1991 | Straka | B60Q 1/2611 |
| | | | | 280/756 |
| 5,048,994 | A * | 9/1991 | Sung | F16B 21/02 |
| | | | | 403/51 |
| 5,779,272 | A * | 7/1998 | Panek | B60R 21/131 |
| | | | | 280/756 |
| 5,890,738 | A * | 4/1999 | Heiner | B60R 21/13 |
| | | | | 280/756 |
| 6,523,857 | B1 * | 2/2003 | Hopton | F16B 7/0406 |
| | | | | 280/756 |
| 8,163,116 | B2 * | 4/2012 | Riley | B62D 27/023 |
| | | | | 156/79 |
| 9,702,391 | B2 * | 7/2017 | Erlacher | B62D 27/026 |
| 2004/0084934 | A1 * | 5/2004 | Yokoo | E02F 9/163 |
| | | | | 296/190.01 |
| 2005/0156422 | A1 * | 7/2005 | Della Valle | B60R 21/131 |
| | | | | 280/756 |
| 2015/0056052 | A1 * | 2/2015 | Kokuryou | E02F 3/32 |
| | | | | 414/687 |
| 2019/0225270 | A1 * | 7/2019 | Upah | B60R 21/13 |

FOREIGN PATENT DOCUMENTS

| | | | |
|---|---|---|---|
| JP | 9-96128 A | 4/1997 | |
| JP | 2003-336289 A | 11/2003 | |
| JP | 2007-297841 A | 11/2007 | |
| JP | 2014-47577 A | 3/2014 | |
| WO | WO-2004026628 A2 * | 4/2004 | B60R 21/13 |
| WO | WO-2008099371 A1 * | 8/2008 | B60R 21/13 |
| WO | WO-2016114407 A1 * | 7/2016 | E02F 9/163 |

OTHER PUBLICATIONS

International Search Report dated Jun. 11, 2019, in connection with corresponding International Patent Application No. PCT/KR2019/002468.

* cited by examiner

CANOPY ASSEMBLY OF CONSTRUCTION MACHINERY

CROSS-REFERENCE TO RELATED APPLICATION

The present application is a national stage filing under 35 U. S. C. § 371 of PCT application number PCT/KR2019/002468 filed on Mar. 4, 2019 which is based upon and claims the benefit of priorities to Korean Patent Application No. 10-2018-0028281, filed on Mar. 9, 2018 in the Korean Intellectual Property Office, which are incorporated herein in their entireties by reference.

TECHNICAL FIELD

The present invention relates to a canopy assembly. More particularly, the present invention relates to a canopy assembly structure which covers above a driver's seat.

BACKGROUND ART

Construction machinery such as excavators, wheel loaders, etc. is designed to perform a variety of works on construction sites. In general, the construction machinery may include a lower body in which a traveling body for driving the construction machinery is installed, a work apparatus for performing the work, a driver's seat on which a driver is boarded, and an upper body coupled rotatably to the lower body and supporting the work apparatus and the driver's seat.

In particular, a canopy covers an upper part of the driver's seat and protects the driver from impacts caused by external falling objects or loads generated when the construction machinery is overturned. The canopy, which is a protection structure for a driver's seat, is mainly installed in compact excavators where a cabin is difficult to be isolated from the outside. The canopy is required to have a strength that satisfies a required level of certification laws for driver protection.

On the other hand, the construction machinery such as small excavators often work in a narrow space. However, due to the canopy fixed to the upper body, even a small excavator has a problem in that it is difficult to work in the narrow space or to enter the narrow work space.

DISCLOSURE OF THE INVENTION

Problems to be Solved

An object of the present invention provides a canopy assembly that can be easily assembled by a driver and has improved rigidity against lateral external forces.

Means to Solve the Problems

According to example embodiments, a canopy assembly includes a lower canopy installed fixedly in a side of a driver's seat and including a pair of first and second lower pipes that extend upwardly respectively, a pair of fastening blocks inserted and fixed into the first and second lower pipes respectively, each of the fastening blocks having a receiving hole therein that extends from an upper surface into the inside thereof, and an upper canopy including a pair of first and second upper pipes that are inserted and fixed into the receiving holes of the fastening blocks respectively.

In example embodiments, the fastening block may include an insertion portion inserted into and fixed to each of cavities of the first and second lower pipes and a head portion extending from the insertion portion to protrude outwardly from the cavity.

In example embodiments, the insertion portion may have an outer diameter less than an inner diameter of the cavity.

In example embodiments, a length of the insertion portion may be greater than a length of the head portion.

In example embodiments, diameters of the first and second upper pipes are less than diameters of the first and second lower pipes.

In example embodiments, the fastening block may include an insertion portion inserted into and fixed to each of cavities of the first and second lower pipes and a head portion extending from the insertion portion to protrude outwardly from the cavity, and the head portion may have a truncated cone shape where a diameter of an upper end portion is less than a diameter of a lower end portion.

In example embodiments, each of the first and second lower pipes has a first fixing hole, the fastening block has a second fixing hole connected to the first fixing hole, and each of the first and second upper pipes has a third fixing hole connected to the second fixing hole, and the canopy assembly may further include a fastening member fastened to the first, second and third fixing holes.

In example embodiments, a plurality of the third fixing holes may be provided in each of the first and second upper pipes to be spaced apart from each other along an extending direction thereof.

In example embodiments, the canopy assembly may further include a covering portion covering the fastening block when the upper canopy and the lower canopy are assembled.

In example embodiments, a drain hole may be provided in a bottom surface of the lower canopy.

In example embodiments, the first and second upper pipes are fixed detachably to the receiving holes of the fastening blocks respectively.

In example embodiments, the first and second lower pipes have heights lower than a height of the driver's seat.

Effects of the Invention

According to example embodiments, since a canopy assembly includes an upper canopy and a lower canopy that can be separated from each other, the upper canopy may be easily separated in necessary, thereby facilitating work in a narrow space.

According to example embodiments, the upper canopy and the lower canopy may be easily combined by the driver by utilizing flanges provided in each of the upper canopy and the lower canopy.

In addition, reinforcing members for supporting the load applied to the canopy assembly may be installed to satisfy certification laws that regulate strengths of TOPS (Tip-over Protection Structure) based on the lateral load.

According to example embodiments, the upper canopy may be fixed to be detachable to the lower canopy via a fastening block. End portions of first and second upper pipes of the upper canopy may be inserted and fixed into first and second lower pipes of the lower canopy through the fastening blocks respectively.

Accordingly, geometric discontinuity due to a difference in diameters between the upper pipe and the lower pipe may be minimized to thereby prevent concentration of stress. Thus, a lateral load caused by the geometric discontinuity may be distributed to thereby eliminate bending deformation due to a hinge point in the upper pipe.

Further, since the upper pipe is formed of a lightweight material, the driver can easily separate and assemble the upper pipe from the lower pipe.

However, the effect of the invention may not be limited thereto, and may be expanded without being deviated from the concept and the scope of the present invention.

BEST MODE FOR CARRYING OUT THE INVENTION

Hereinafter, preferable embodiments of the present invention will be explained in detail with reference to the accompanying drawings.

In the drawings, the sizes and relative sizes of components or elements may be exaggerated for clarity.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments may, however, be embodied in many different forms and should not be construed as limited to example embodiments set forth herein. Rather, these example embodiments are provided so that this disclosure will be thorough and complete, and will fully convey the scope of example embodiments to those skilled in the art.

Figure 1:
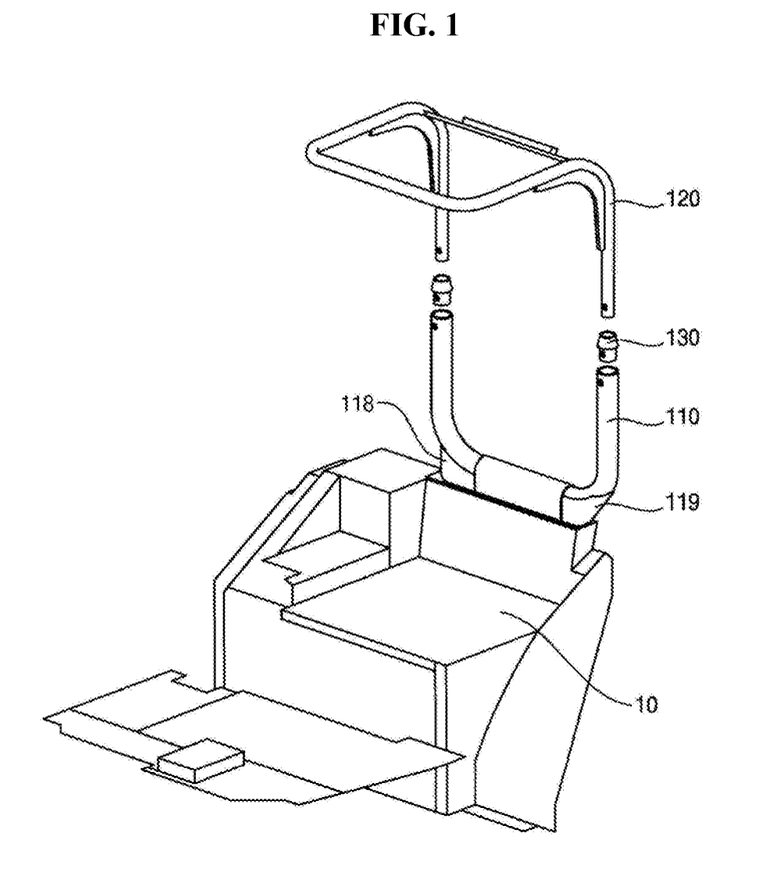
FIG. 1 is an exploded perspective view illustrating a canopy assembly in accordance with example embodiments.
Figure 2:
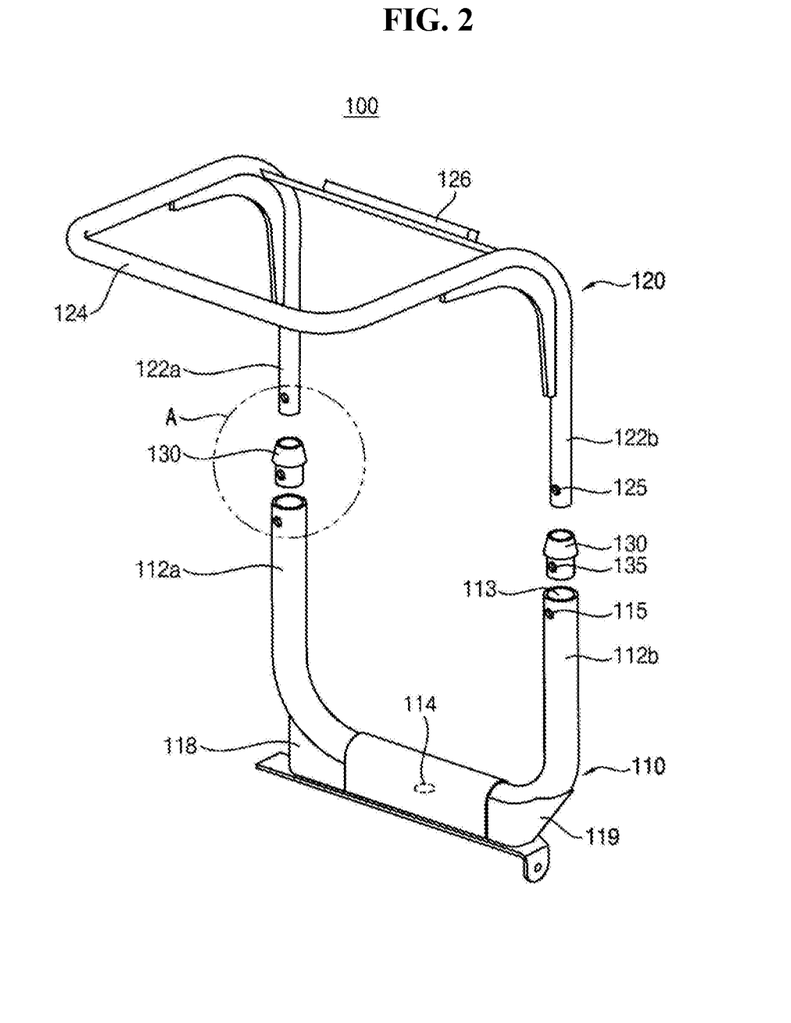
FIG. 2 is an exploded perspective view illustrating the canopy assembly in FIG. 1.
Figure 3:
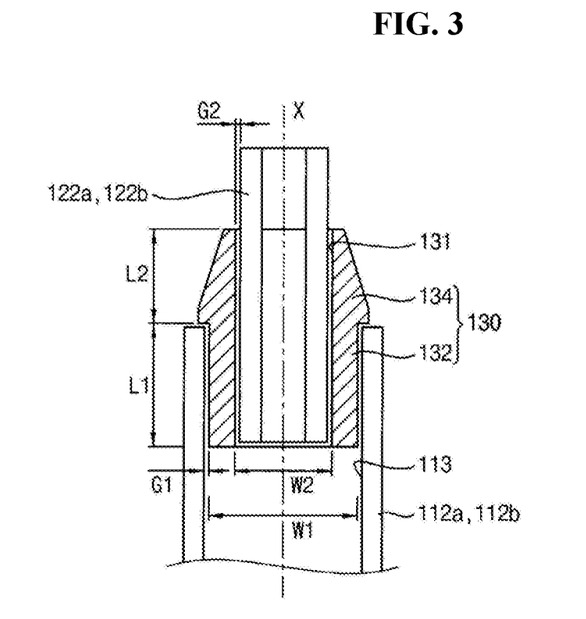
FIG. 3 is a cross-sectional view illustrating 'A' portion in FIG. 2.
Figure 4:
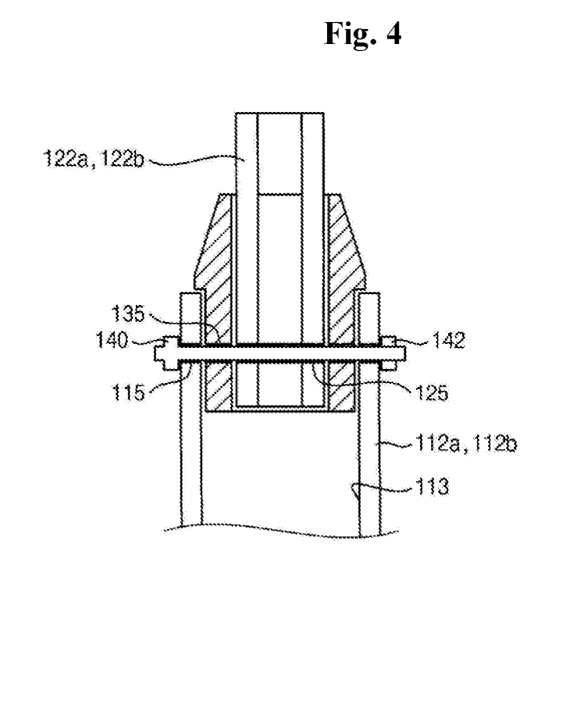
FIG. 4 is a cross-sectional view illustrating a fastening member of the canopy assembly in FIG. 2.
Figure 5:
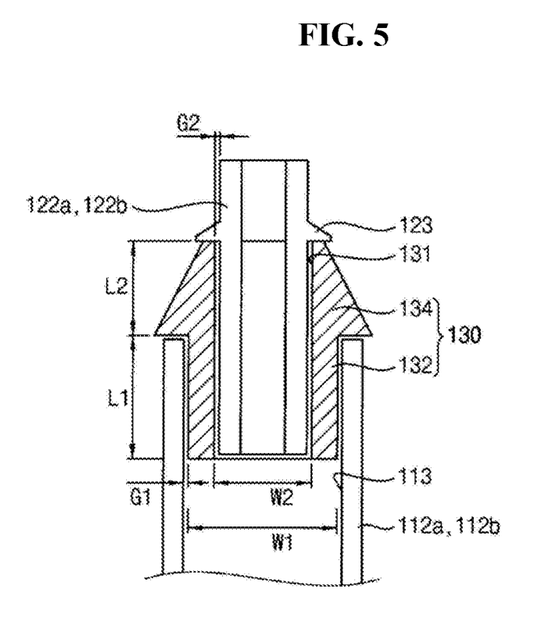
FIG. 5 is a cross-sectional view illustrating a portion of the canopy assembly in accordance with example embodiments.

FIG. 1 is an exploded perspective view illustrating a canopy assembly in accordance with example embodiments. FIG. 2 is an exploded perspective view illustrating the canopy assembly in FIG. 1. FIG. 3 is a cross-sectional view illustrating 'A' portion in FIG. 2. FIG. 4 is a cross-sectional view illustrating a fastening member of the canopy assembly in FIG. 2. FIG. 5 is a cross-sectional view illustrating a portion of the canopy assembly in accordance with example embodiments.

Referring to FIGS. 1 to 5, a canopy assembly 100 may include a lower canopy 110 and an upper canopy 120 installed fixedly in a side of a driver's seat, and the lower canopy 110 and the upper canopy 120 may be connected detachably to each other.

In example embodiments, the canopy assembly 100 may support a canopy (not illustrated) that covers above the driver's seat. The canopy assembly 100 may be installed in an upper body of construction machinery such as a compact excavator.

For example, the upper body may include a main frame mounted on a travelling body and a seat base 10 for driver's seat installed in the main frame. In case of the construction machinery such as an excavator, a wheel loader, etc, a work apparatus may be supported pivotally on the main frame. The canopy assembly 100 may be installed adjacent to the seat base 10 to extend upwardly.

In particular, the lower canopy 110 may be installed fixedly to the seat base 10, and may include a pair of first and second lower pipes 112a, 112b that extend upwardly respectively. The lower canopy 110 may further include a lower base 111 fastened to a rear side of the seat base. The first and second lower pipes 112a, 112b may be lower columns that extend upwardly from both sides of the lower base 111 respectively.

The canopy assembly 100 may further include a first reinforcing member 118 and a second reinforcing member 119 for fixing the lower pipe 110 to the upper body and reinforcing rigidity against impact and load.

The first and second lower pipes 112a, 112b may extend upwardly to have a predetermined height so that, as described later, when first and second upper pipes 122a, 122b are detached, a driver may easily perform work in a narrow work place.

A driver's seat on which the driver can sit may be installed on the seat base 110, and the driver's seat may include a backrest for supporting the driver's back or a headrest for supporting the driver's head. Upper ends of the backrest or the headrest may correspond to an upper part of the driver's seat. The first and second lower pipes 112a, 112b may extend upwardly from the seat base 10 to have heights lower than the upper part of the driver's seat. Thus, when the first and second lower pipes 112a, 112b extend upwardly to be relatively high, lengths of the first and second upper pipes 122a, 122b may be reduced or minimized. Accordingly, working in a narrow work place may become easy, and also, a weight of the upper canopy 120 may be lighter than when the first and second upper pipes 122a, 122b extend near the lower base 111. That is, work efficiency in a narrow work place may be improved and the upper canopy 120 may be easily detached.

In example embodiments, a pair of fastening blocks 130 may be fixed detachably to the first and second lower pipes 112a, 112b respectively. The fastening blocks 130 may be inserted and fixed into cavities 113 of the first and second lower pipes 112a, 112b, respectively. The fastening block 130 may have a receiving hole 131 that extends from an upper surface into the inside thereof. The receiving hole 131 may extend along an extending direction (central axis X direction) of the fastening block 130. The receiving hole 131 may be formed to penetrate through the fastening block 130. The central axis X of the receiving hole 131 may be concentric with central axes of the first and second lower pipes 112a, 112b.

The fastening block 130 may include an insertion portion 132 inserted into and fixed to each of the cavities 113 of the first and second lower pipes 112a, 112b and a head portion 134 extending from the insertion portion 132 to protrude outwardly from the cavity 113. The insertion portion 132 may have an outer diameter W1 less than an inner diameter of the cavity 113. The head portion 134 may have an outer diameter greater than the inner diameter of the cavity 113.

The insertion portion 132 may have a first length L1, and the head portion 134 may have a second length L2. The second length L2 of the head portion 134 may be greater than the first length L1 of the insertion portion 132. That is, a ratio of the first length L1 and the second length L2 may be greater than 1.

The upper canopy 120 may be fixed detachably to the lower canopy 110 via the pair of the fastening blocks 130. The upper canopy 120 may include a pair of first and second upper pipes 122a, 122b which are inserted into and fixed to the cavities 131 of the fastening block 130 respectively. The first and second pipes 122a, 122b may be fixed detachably to the fastening blocks 130 respectively. The first and second pipes 122a, 122b may be upper columns that extend upwardly from the cavities 131 of the fastening blocks 130 respectively.

The first and second upper pipes 122a, 122b may be inserted into and fixed to the cavities 131 of the fastening blocks 130, and fastening blocks 130 may be inserted into and fixed to the cavities 113 of the first and second lower pipes 112a, 112b. Accordingly, outer diameters of the first and second upper pipes 122a, 122b may be less than the outer diameters of the first and second lower pipes 112a, 112b.

The ratio of the first length L1 of the insertion portion 132 of the fastening block 130 and the second length L2 of the head portion 134, a ratio of the diameter of the lower pipe 112a, 112b and the diameter of the upper pipe 122a, 122b, a gap G1 between the upper pipe 122a, 122b and the fastening block 130, and a gap G2 between the lower pipe 112a, 112b and the fastening block 130 may be determined in consideration of minimization of geometric discontinuity, load bearing capacity, etc. due to the differences in the diameters of the upper and lower pipes.

As illustrated in FIG. 4, in example embodiments, the canopy assembly may further a fastening member for fixing the first and second lower pipes 112a, 112b, the fastening block 130 and the first and second upper pipes 122a, 122b to each other.

In particular, each of the first and second lower pipes 112a, 112b may have a first fixing hole 115, the fastening block 130 may have a second fixing hole 135 connected to the first fixing hole 115, and each of the first and second upper pipes 122a, 122b may have a third fixing hole 125 connected to the second fixing hole 135.

The fastening member may include a fixing bolt 140 fastened to the first to third fixing holes 115, 135, 125 and a fixing nut 142 fastened to an end of the fixing bolt 140.

In example embodiments, the upper canopy 120 may further include a first connection member 124 extending in a U-shape in a horizontal direction from each of the first and second upper pipes 122a, 122b. Additionally, the upper canopy 120 may further include a second connection member 126 extending parallel to the first connection member 124 and connecting the first and second upper pipes 122a, 122b to each other.

The first connection member 124 and the second connection member 126 may have an approximately rectangular frame shape. Accordingly, the canopy having a quadrangular shape may be attached and supported on the first and second connection members 124, 126.

As mentioned above, the upper canopy 120 may be fixed detachably to the lower canopy 110 via the fastening block 130. End portions of the first and second upper pipes 122a, 122b of the upper canopy 120 may be inserted into and fixed to the first and second lower pipes 112a, 112b of the lower canopy 110 through the fastening blocks 130.

Additionally, the head portion 134 of the fastening block 130 may have an inclined outer peripheral surface. The outer diameter of the head portion 134 may be increased downward along the central axis X. For example, the head portion 134 may have a truncated cone shape. An upper end portion of the head portion 134 may be provided near the outer diameter of the upper pipe 122a, 122b, and a lower end portion of the head portion 134 may be provided near the outer diameter of the lower pipe 112a, 112b. The head portion 134 having this shape may minimize geometric discontinuity due to the difference in the diameters between the upper pipe and the lower pipe to thereby prevent concentration of stress. That is, by distributing a lateral load that may be caused by the geometric discontinuity, bending deformation due to a hinge point in the upper pipe may be eliminated.

Further, the diameter of the upper pipe may be minimized to reduce the weight of the upper pipe, so that a driver can easily disassemble and assemble the upper pipe from the lower pipe.

In example embodiments, the canopy assembly may further include a foreign material penetration preventing member for preventing a foreign material such as rainwater from penetrating into a coupling portion between the upper pipe and the lower pipe.

As illustrated in FIG. 5, the foreign material penetration prevention member may include a covering member 123 arranged above the fastening block 130. The covering member 123 may be formed integrally with the upper pipe 122a, 122b. The covering member 123 may be formed to protrude outwardly from the upper pipe 122a, 122b above the fastening block 130. An outer diameter of the covering portion 123 may be greater than an outer diameter of an upper end portion of the fastening block 130. The covering member 123 may cover the coupling portion between the upper pipes 122a, 122b and the fastening block 130. Alternatively, the covering member may be separately installed in the gap between the fastening block 130 and the upper pipes 122a, 122b.

Additionally, an outer diameter of a lower end portion of the head portion 134 of the fastening block 130 may be greater than the outer diameter of the lower pipe 112a, 112b. Accordingly, the head portion 134 may cover the coupling portion between the lower pipes 112a, 112b and the fastening block 130. Thus, external foreign materials may be prevented from penetrating into the coupling portion between the lower pipes 112a, 112b and the fastening block 130.

In example embodiments, a drain hole 114 for draining rainwater which penetrates into the lower pipe through the coupling portion between the upper pipe and the lower pipe may be formed to penetrate through a bottom surface of the lower canopy 110. For example, the drain hole 114 may be formed to penetrate through a lower end portion of the lower base 111.

The drain hole may be formed to penetrate through a lower end portion of the lower pipe 112a, 112b. For example, in case that an inner space of the lower base and an inner space of the lower pipe 112a, 112b are not connected to each other, the drain hole may be formed to penetrate through the lower end portion of the lower pipe 112a, 112b.

Figure 6:
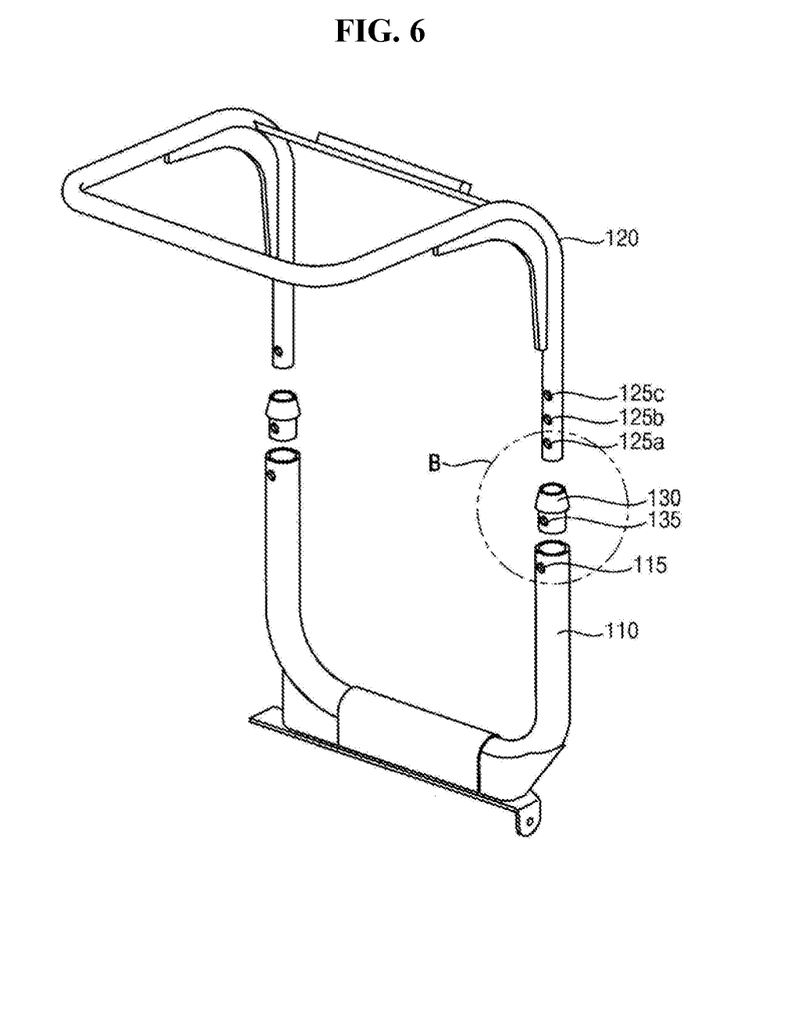
FIG. 6 is an exploded perspective view illustrating a canopy assembly in accordance with example embodiments.
Figure 7:
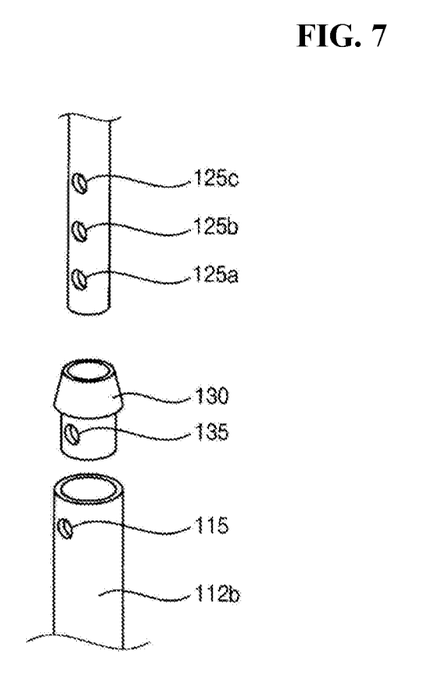
FIG. 7 is a perspective view illustrating 'B' portion in FIG. 6.

FIG. 6 is an exploded perspective view illustrating a canopy assembly in accordance with example embodiments. FIG. 7 is a perspective view illustrating 'B' portion in FIG. 6. The canopy assembly may be substantially the same as or similar to the canopy assembly described with reference to FIGS. 1 to 4 except that the canopy assembly further includes a structure capable of adjusting a height of the canopy assembly. Thus, same reference numerals will be used to refer to the same or like elements and any further repetitive explanation concerning the above elements will be omitted.

Referring to FIGS. 6 and 7, each of first and second upper pipes 122a, 122b of an upper canopy 120 of a canopy assembly according to example embodiments may have a plurality of third fixing holes 125a, 125b, 125c.

The third fixing holes 125a, 125b, 125c may be formed along an extending direction of each of the first and second upper pipes 122a, 122b to be spaced apart from each other. One of the third fixing holes 125a, 125b, 125c may be connected to a first fixing hole 115 of each of first and second lower pipes 112a, 112b and a second fixing hole 135 of a fastening block 130, and may be fastened by a fastening member such as a fixing bolt.

As the position of the third fixing hole fastened by the fastening member becomes higher, the heights of the first and second upper pipes 122a, 122b may be decreased. Conversely, as the position of the third fixing hole fastened by the fastening member becomes lower, the heights of the first and second upper pipes 122a, 122b may be increased.

Accordingly, since the height of the upper canopy 120 can be adjusted according to working environments and a body size of a driver, it may be designed in a form that facilitates user convenience and visibility.

Figure 8:
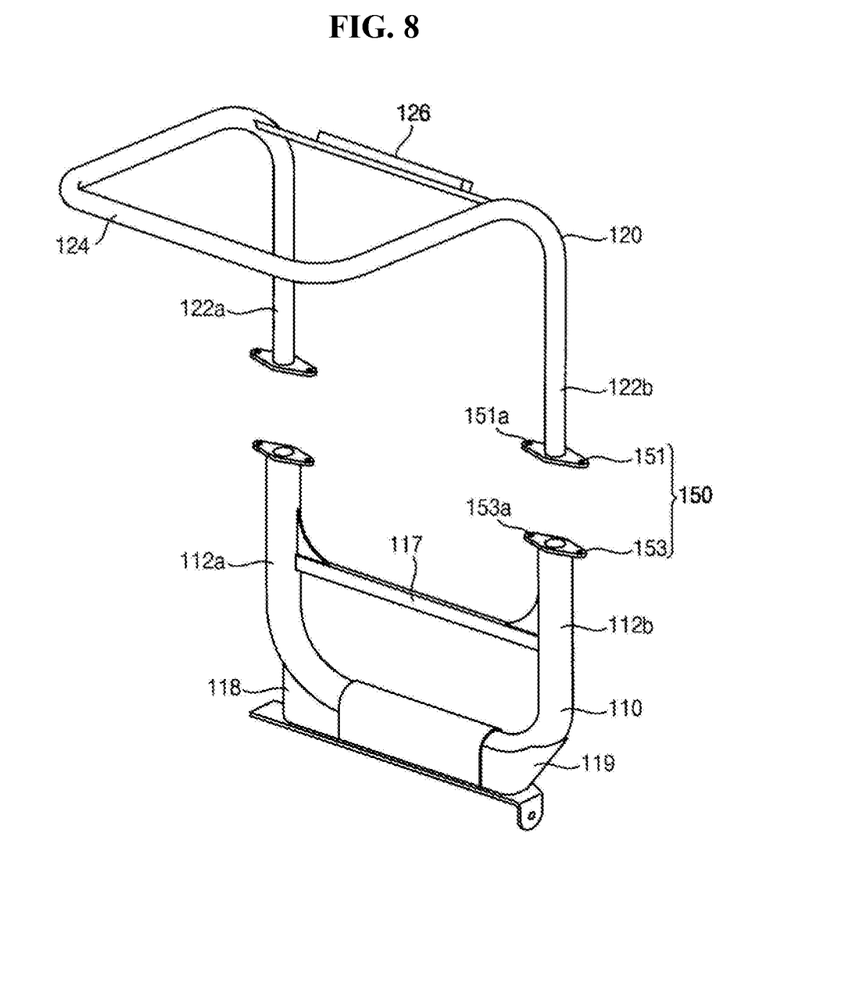
FIG. 8 is an exploded perspective view illustrating a canopy assembly in accordance with example embodiments.
Figure 9:
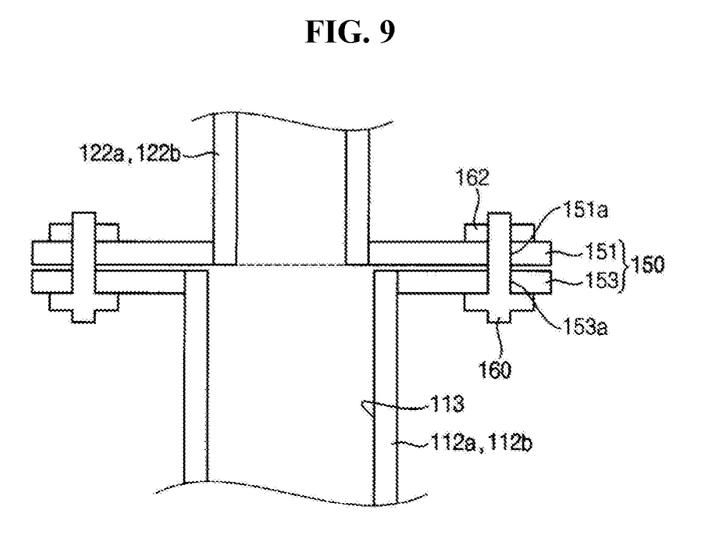
FIG. 9 is a perspective view illustrating a fastening structure of the canopy assembly in FIG. 8.

FIG. 8 is an exploded perspective view illustrating a canopy assembly in accordance with example embodiments. FIG. 9 is a perspective view illustrating a fastening structure of the canopy assembly in FIG. 8. The canopy assembly may be substantially the same as or similar to the canopy assembly described with reference to FIGS. 1 to 4 except for a fastening structure between an upper canopy and a lower canopy and a rigidity reinforcing member. Thus, same reference numerals will be used to refer to the same or like elements and any further repetitive explanation concerning the above elements will be omitted.

Referring to FIGS. 8 and 9, a canopy assembly according to example embodiments may include a flange portion 150 for coupling an upper canopy 120 and a lower canopy 110 to be detachable. The flange portion 150 may include a first flange portion 151 provided in a lower end portion of an upper pipe 122a, 122b and a second flange portion 153 provided in an upper end portion of a lower pipe 112a, 112b.

The first flange portion 151 may have a plate shape surrounding the lower end portion of the upper pipes 122a, 122b and extending radially from the lower end portion of the upper pipes 122a, 122b. The second flange portion 153 may have a plate shape surrounding the upper end portion of the lower pipes 112a, 112b and extending radially from the upper end portion of the lower pipes 112a, 112b.

The first flange portion 151 and the second flange portion 153 may be in contact with each other when the upper canopy 120 and the lower canopy 110 are coupled, to facilitate load transfer between the upper canopy 120 and the lower canopy 110. In order to increase the load transfer effect, the first flange portion 151 and the second flange portion 153 may have shapes corresponding to each other.

A through hole 151a may be formed in the first flange portion 151, and a second through hole 153a may be formed in the second flange portion 153. The first through hole 151a and the second through hole 153a may communicate with each other when the upper canopy 120 and the lower canopy 110 are coupled, to be fastened by fastening members such as a bolt 160 and a nut 162. By this coupling of the first flange portion 151 and the second flange portion 153, the upper canopy 120 and the lower canopy 110 may be coupled to be separable from each other.

In this case, the upper pipe 122a, 122b may have a diameter smaller than the lower pipe 112a, 112b. Accordingly, the weight of the upper canopy 120 may be minimized.

In example embodiments, the lower canopy 110 may further include a third rigidity reinforcing member 117. The third rigidity reinforcing member 117 may be installed at a predetermined height from the lower end portion of the lower canopy 110 to connect and support approximately middle portions of the first lower pipe 112a and the second lower pipe 112b. The third rigidity reinforcing member 117 may improve rigidity against a lateral load even in the flange-type coupling structure of the upper canopy 120 and the lower canopy 110.

Figure 10:
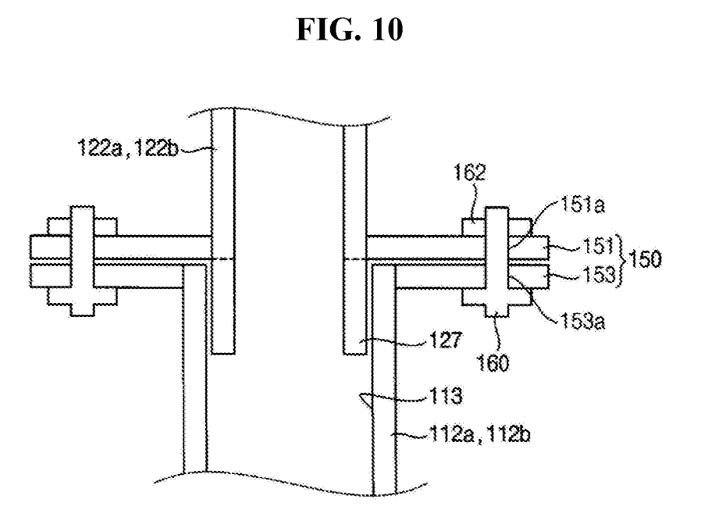
FIG. 10 is a perspective view illustrating a fastening structure of a canopy assembly in accordance with example embodiments.

FIG. 10 is a perspective view illustrating a fastening structure of a canopy assembly in accordance with example embodiments. The canopy assembly may be substantially the same as or similar to the canopy assembly described with reference to FIGS. 8 and 9 except for a reinforcing member of an upper canopy. Thus, same reference numerals will be used to refer to the same or like elements and any further repetitive explanation concerning the above elements will be omitted.

Referring to FIG. 10, first and second upper pipes 122a, 122b of an upper canopy may further include insertion extensions 127 which are inserted and fixed into cavities 113 of first and second lower pipes 112a, 112b when the upper canopy 120 and a lower canopy 110 are coupled.

The insertion extension 127 may be formed to extend from each of lower end portion s of the first and second upper pipes 122a, 122b. The insertion extension 127 may extend downwardly from a first flange portion 151 to be inserted into each of the cavities 113 of the first and second lower pipes 112a, 112b. The insertion extension 127 may contact and support an inner surface of each of the cavities 113 of the first and second lower pipes 112a, 112b. The insertion extension 127 may serve as a reinforcing member capable of improving rigidity against a lateral load.

The present invention has been explained with reference to preferable embodiments, however, those skilled in the art may understand that the present invention may be modified or changed without being deviated from the concept and the scope of the present invention disclosed in the following claims.

THE DESCRIPTION OF THE REFERENCE NUMERALS

10: seat base 100: canopy assembly
110: lower canopy 111: lower base
112a, 112b: lower pipe 115: first fixing hole
120: upper canopy 122a, 122b: upper pipe
123: covering member 124: first connection member
125: second fixing hole 126: second connection member
127: insertion extension 130: fastening block
131: receiving hole 132: insertion portion
134: head portion 135, 135a, 135b, 135c: third fixing hole
140: fixing bolt 142: fixing nut
150: flange portion 151: first flange portion
151a: first through hole 153: second flange portion
153a: second through hole

The invention claimed is:

1. A canopy assembly, comprising:
a lower canopy including a pair of first and second lower pipes that extend upwardly respectively;
a pair of fastening blocks inserted and fixed into the first and second lower pipes respectively, each of the fastening blocks having a receiving hole extending therethrough; and
an upper canopy including a pair of first and second upper pipes that are inserted and fixed into the receiving holes of the fastening blocks respectively,
wherein
each of the first and second lower pipes includes a cavity, each of the fastening blocks includes
an insertion portion inserted and fixed into the corresponding cavity,
a head portion continuously extending from the insertion portion to protrude outwardly from the corresponding cavity, the head portion in each of the fastening blocks is disposed outside the corresponding one of the first and second lower pipes,
the canopy assembly further comprises a pair of covering portions, and
when the upper canopy and the lower canopy are assembled, the pair of covering portions are located outside the first and second lower pipes and respectively cover the pair of fastening blocks.

2. The canopy assembly of claim 1, wherein the insertion portion has an outer diameter less than an inner diameter of the corresponding cavity.

3. The canopy assembly of claim 1, wherein a length of the insertion portion is greater than a length of the head portion.

4. The canopy assembly of claim 1, wherein diameters of the first and second upper pipes are less than diameters of the first and second lower pipes.

5. The canopy assembly of claim 4, wherein
the head portion has a truncated cone shape where a diameter of an upper end portion is less than a diameter of a lower end portion.

6. The canopy assembly of claim 1, wherein each of the first and second lower pipes has a first fixing hole, the fastening block has a second fixing hole connected to the first fixing hole, and each of the first and second upper pipes has a third fixing hole connected to the second fixing hole, and
the canopy assembly, further comprising:
a fastening member fastened to the first, second and third fixing holes.

7. The canopy assembly of claim 6, wherein a plurality of the third fixing holes is provided in each of the first and second upper pipes to be spaced apart from each other along an extending direction thereof.

8. The canopy assembly of claim 1, wherein a drain hole is provided in a bottom surface of the lower canopy.

9. The canopy assembly of claim 1, wherein the first and second upper pipes are fixed detachably to the receiving holes of the fastening blocks respectively.

10. The canopy assembly of claim 1, wherein each of the fastening blocks is formed in a single piece including the insertion portion and the head portion.

* * * * *